(12) United States Patent
Jeong

(10) Patent No.: US 10,476,304 B2
(45) Date of Patent: Nov. 12, 2019

(54) WIRELESS POWER RECEIVE COIL FOR METAL BACKED DEVICE

(71) Applicant: QUALCOMM Incorporated, San Diego, CA (US)

(72) Inventor: Seong Heon Jeong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 15/148,653

(22) Filed: May 6, 2016

(65) Prior Publication Data

US 2016/0352149 A1    Dec. 1, 2016

Related U.S. Application Data

(60) Provisional application No. 62/192,277, filed on Jul. 14, 2015, provisional application No. 62/167,106, filed on May 27, 2015.

(51) Int. Cl.
| | | |
|---|---|---|
| *H02J 50/12* | (2016.01) | |
| *H02J 7/02* | (2016.01) | |
| *H01F 38/14* | (2006.01) | |
| *H04B 5/00* | (2006.01) | |

(52) U.S. Cl.
CPC ............. *H02J 50/12* (2016.02); *H01F 38/14* (2013.01); *H02J 7/025* (2013.01); *H04B 5/0037* (2013.01); *H04B 5/0075* (2013.01)

(58) Field of Classification Search
CPC .. H02J 50/00; H02J 50/10; H02J 50/12; H02J 7/00; H02J 7/025; H04B 5/00; H04B 5/0037; H04B 5/0075; H05K 5/00; H05K 5/03; H05K 5/04; H01F 27/00; H01F 27/2823; H01F 38/00; H01F 38/14
USPC ........................................................ 307/104
See application file for complete search history.

(56) References Cited

U.S. PATENT DOCUMENTS

| | | |
|---|---|---|
| 8,536,738 B2 | 9/2013 | Bella |
| 8,922,438 B2 | 12/2014 | Nakano |
| 2012/0057322 A1 | 3/2012 | Waffenschmidt |
| 2012/0262357 A1* | 10/2012 | Kato ................... H01Q 1/38 343/788 |

(Continued)

FOREIGN PATENT DOCUMENTS

| | | |
|---|---|---|
| EP | 2838157 A1 | 2/2015 |
| WO | 8907347 A1 | 8/1989 |

OTHER PUBLICATIONS

International Search Report and Written Opinion—PCT/US2016/032555—ISA/EPO—dated Jul. 4, 2016—13 pgs.

*Primary Examiner* — Lincoln D Donovan
*Assistant Examiner* — Dave Mattison
(74) *Attorney, Agent, or Firm* — Hunter Clark PLLC

(57) ABSTRACT

An apparatus for wirelessly coupling power via a first magnetic field may include an electrically conductive casing portion configured to generate a second magnetic field in response to eddy currents induced in the electrically conductive casing portion by the first magnetic field. The electrically conductive casing portion may include a non-conductive area and a first slot. A power receiving element wound around the non-conductive area and crossing over the first slots can couple to the second magnetic field to output electrical current to wirelessly power or charge a load.

28 Claims, 14 Drawing Sheets

(56) References Cited

U.S. PATENT DOCUMENTS

| | | | |
|---|---|---|---|
| 2012/0326936 A1* | 12/2012 | Tu | H01Q 13/10 343/767 |
| 2015/0009077 A1* | 1/2015 | Lee | H01Q 1/243 343/702 |
| 2015/0137742 A1* | 5/2015 | Tseng | H02J 7/025 320/108 |
| 2015/0194840 A1 | 7/2015 | Lee et al. | |
| 2015/0256021 A1 | 9/2015 | Kwon et al. | |

* cited by examiner

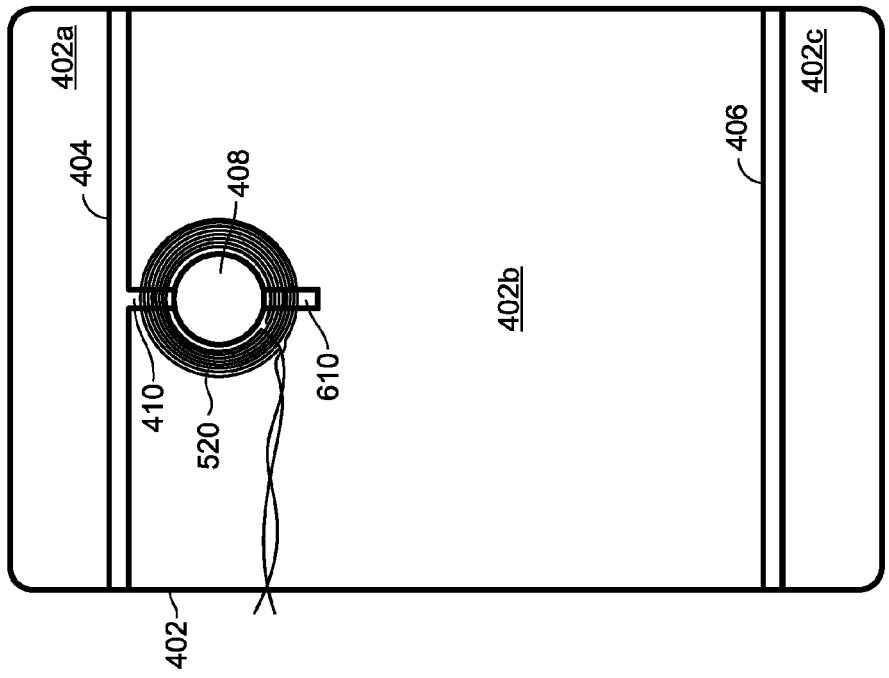
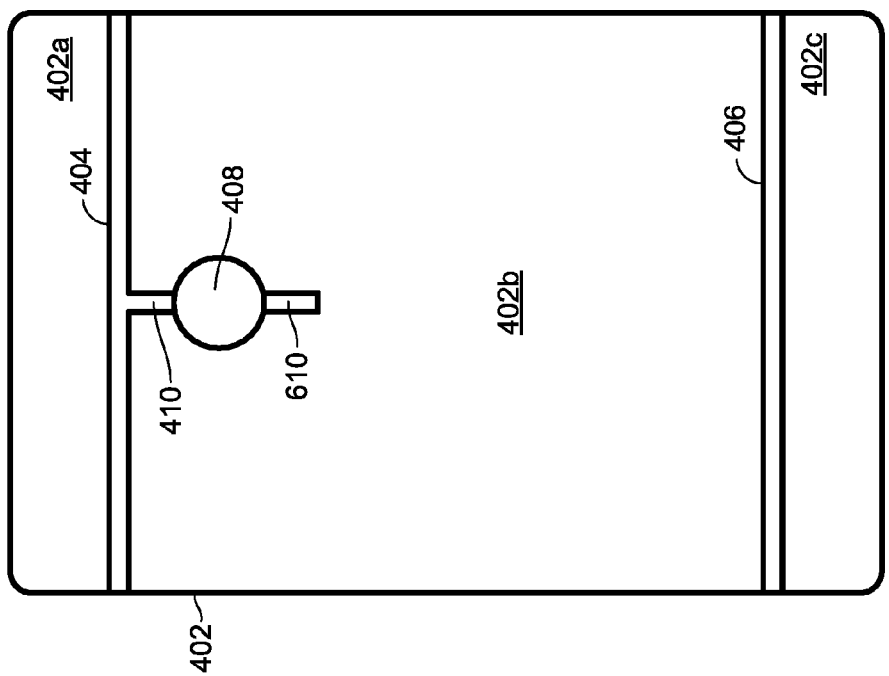

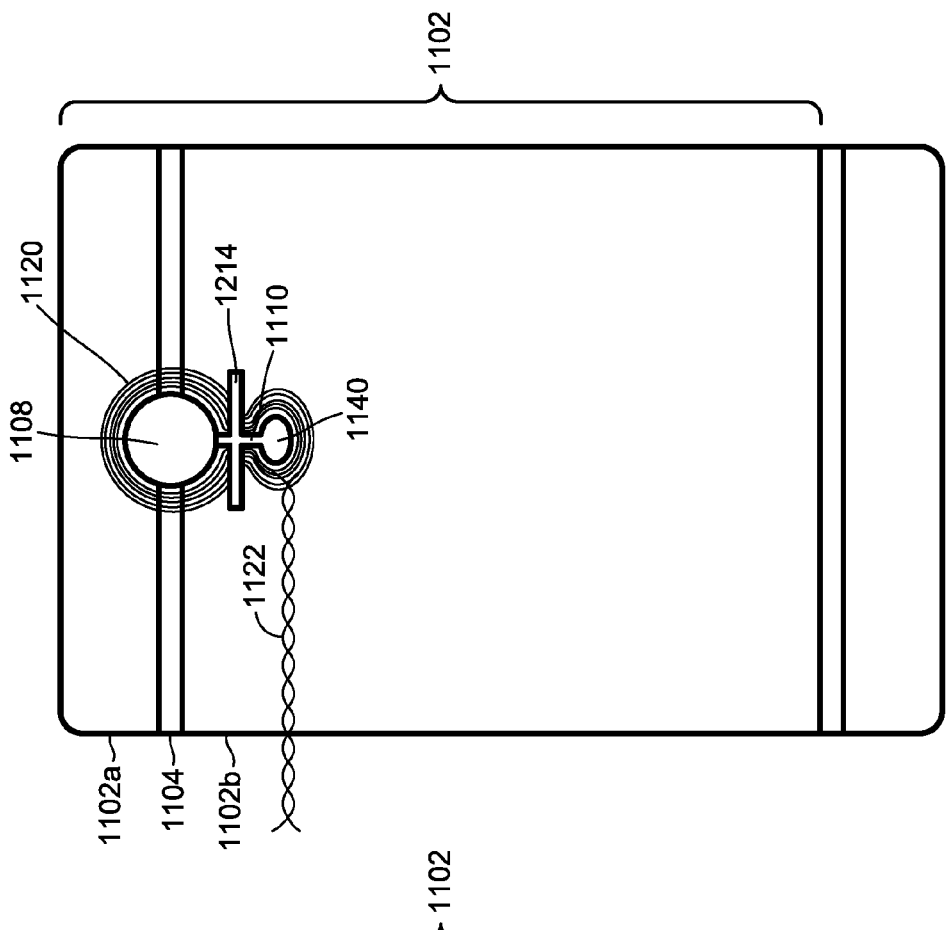
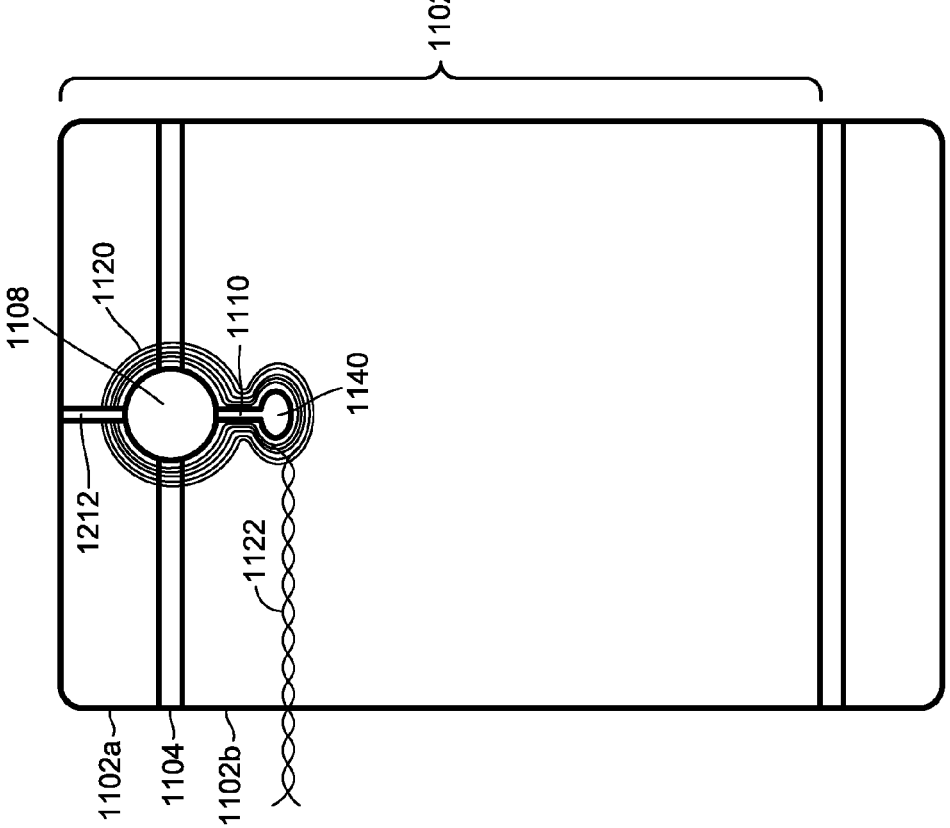

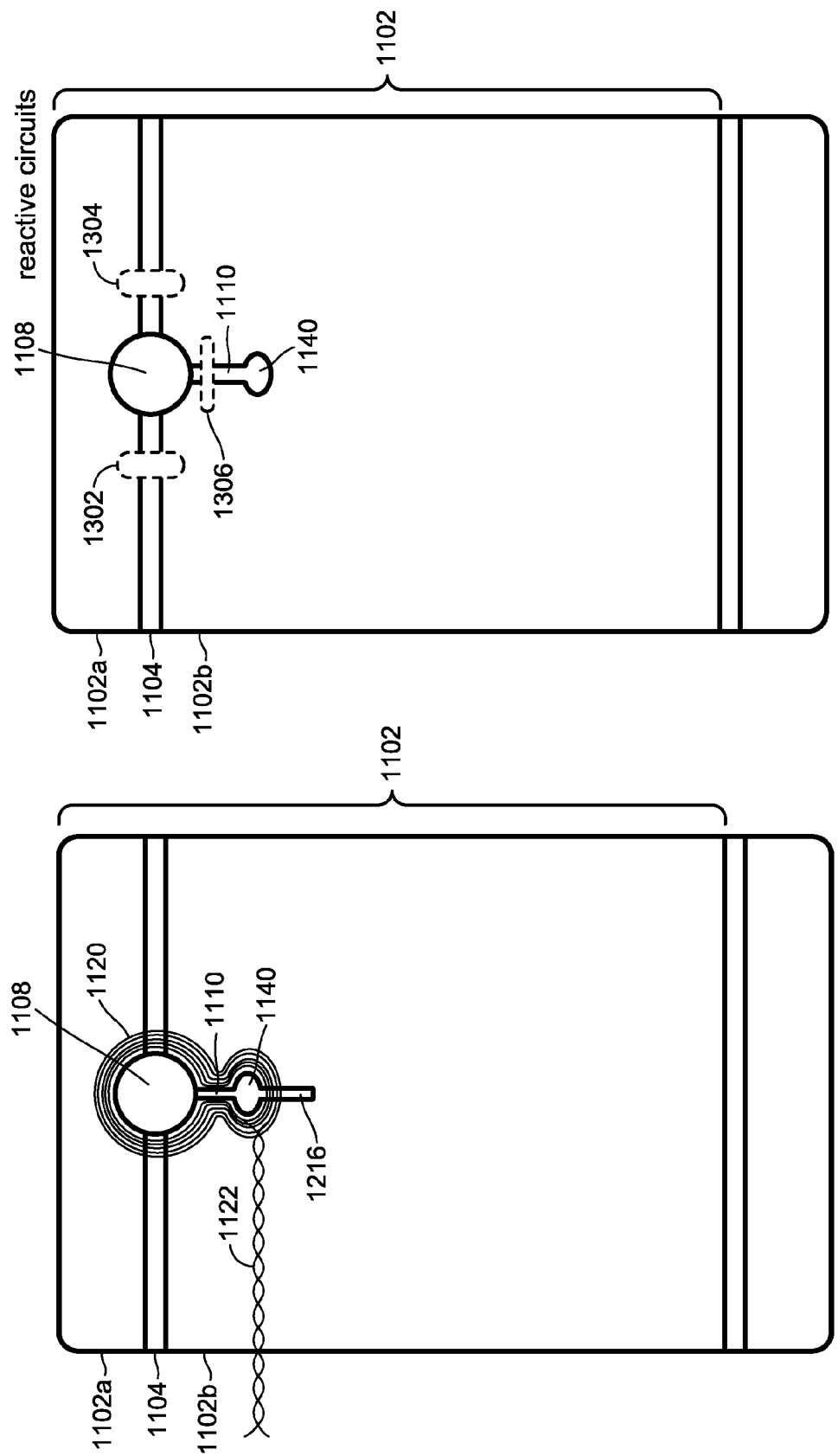

WIRELESS POWER RECEIVE COIL FOR METAL BACKED DEVICE

CROSS-REFERENCE TO RELATED APPLICATIONS

Pursuant to 35 U.S.C. § 119(e), this application is entitled to and claims the benefit of the filing date of U.S. Provisional App. No. 62/167,106 filed May 27, 2015 and U.S. Provisional App. No. 62/192,277 filed Jul. 14, 2015, the content of both of which are incorporated herein by reference in their entirety for all purposes.

TECHNICAL FIELD

The present disclosure relates generally to wireless power transfer systems. More particularly, the present disclosure relates to electronic devices with metal backs and integrated power receiving element configurations.

BACKGROUND

Unless otherwise indicated, the foregoing is not admitted to be prior art to the claims recited herein and should not be construed as such.

In wireless power applications, wireless power charging systems may provide the ability to charge and/or power electronic devices without physical, electrical connections, thus reducing the number of components required for operation of the electronic devices and simplifying the use of the electronic device. Such wireless power charging systems may comprise a transmitter antenna and other transmitting circuitry configured to generate a magnetic field that may induce a current in a receiver antenna that may be connected to the electronic device to be charged or powered wirelessly. Some portable electronic devices may have housings made of various materials including metal. As it is desirable to incorporate wireless power circuitry into various portable electronic devices, there is a need for a system and method for performing wireless power transfer through metal objects.

SUMMARY

In accordance with aspects of the present disclosure, apparatus for wirelessly coupling power via a first magnetic field generated by a transmitter may include a conductive casing portion configured to generate a second magnetic field in response to eddy currents induced in response to the first magnetic field. The conductive casing portion may have a shape that defines a non-conductive area, a first slot and a second slot extending in different directions from the non-conductive area. The apparatus may include a power receiving element comprising a plurality of conductive windings arranged on the electrically conductive casing portion and wound around the non-conductive area and crossing over the first and second slots. The power receiving element may be configured to couple to the second magnetic field to output electrical current to wirelessly power or charge a load.

In some embodiments, the conductive windings may cross over the slots substantially perpendicular to the direction the first and second slots extend from the non-conductive area.

In some embodiments, the conductive windings may comprise insulated wire wound adjacent the non-conductive area, and each winding of the insulated wire is in contact with another winding of the insulated wire.

In some embodiments, the number of turns of conductive winding around the non-conductive area is greater than 6 or between 7-12.

In some embodiments, the apparatus may further include a ferromagnetic material.

In some embodiments, the power receiving element is wound such that it is non-overlapping with the non-conductive area.

In some embodiments, the power receiving element is wound to cross the non-conductive area.

In some embodiments, the apparatus may further include a receive circuit comprising a rectifier operably coupled to the power receiving element and configured to rectify AC through the power receiving element to power the load.

In some embodiments, either or both the first and second slots may not extend to an edge of the electrically conductive casing portion.

In some embodiments, the first and second slots may extend in opposite directions from each other.

In some embodiments, the first and second slots may lie at 90 degree angles from each other.

In some embodiments, the power receiving element may be electrically connected in a resonant circuit.

In some embodiments, the apparatus may further include an electronic device or sensor arranged in the non-conductive area.

In some embodiments, the electrically conductive casing portion may at least partially encase or house a portable electronic device.

In accordance with aspects of the present disclosure, an apparatus for wirelessly coupling power via a first magnetic field generated by a transmitter may include an electrically conductive casing portion configured to generate a second magnetic field in response to eddy currents induced in response to the first magnetic field. The electrically conductive casing portion may have a shape that defines a non-conductive area and a first slot extending from the non-conductive area. A power receiving element may include a plurality of conductive windings wound on the electrically conductive casing portion and at least partially around the non-conductive area and crossing over the first slot. The power receiving element may be configured to couple to the second magnetic field to output electrical current to wirelessly power or charge a load.

In some embodiments, the first slot may not extend to an edge of the electrically conductive casing portion.

In some embodiments, the electrically conductive casing portion may include a first side shorter than a second side, wherein the first slot extends between the non-conductive area to the first side.

In some embodiments, the electrically conductive casing portion may include a first conductive segment and a second conductive segment spaced apart from the first conductive segment by a gap therebetween. The non-conductive area may be defined in the first conductive segment and the first slot may extend from the non-conductive area to the gap.

In some embodiments, the apparatus may further include a second slot extending from the non-conductive area. The plurality of conductive windings may cross over the second slot.

In some embodiments, the conductive windings may comprise insulated wire wound adjacent the non-conductive area, and each winding of the insulated wire is in contact with another winding of the insulated wire.

In accordance with aspects of the present disclosure, a method for wirelessly coupling power via a first magnetic field generated by a transmitter may include generating a second magnetic field in response to eddy currents induced in response to the first magnetic field. The electrically conductive casing portion may have a shape that defines a non-conductive area, a first slot extending from the non-conductive area. The method may further include wirelessly coupling power from the second magnetic field via a power receiving element comprising a plurality of conductive windings arranged on the electrically conductive casing portion and around the non-conductive area, and further crossing over the first slot.

In accordance with aspects of the present disclosure, an apparatus for wirelessly coupling power via a first magnetic field generated by a transmitter may include an electrically conductive casing portion configured to generate a second magnetic field in response to eddy currents induced in response to the first magnetic field. The electrically conductive casing portion may include a first piece of electrically conductive material having a shape that defines a first portion of a non-conductive area and a second piece of electrically conductive material having a shape that defines a second portion of the non-conductive area. The first and second pieces of electrically conductive material may be spaced apart by a first slot. A power receiving element may include a plurality of conductive windings disposed on the first and second pieces of electrically conductive material and wound about a periphery of the non-conductive area. The plurality of conductive windings may cross the first slot at first and second locations thereof. The power receiving element may be configured to couple to the second magnetic field to output electrical current to wirelessly power or charge a load.

In some embodiments, the shape of the second piece of electrically conductive material may further define an additional non-conductive area and a second slot that extends between the first portion of the non-conductive area and the additional non-conductive area. The plurality of conductive windings may be wound about a periphery of the second slot and the additional non-conductive area.

In some embodiments, the apparatus may further include a circuit connected across the additional slot.

In some embodiments, the circuit may be a reactive circuit.

In some embodiments, the shape of the second piece of electrically conductive material further may define a third slot that crosses the second slot. The plurality of conductive windings may be disposed across the third slot at first and second locations thereof.

In some embodiments, the shape of the second piece of electrically conductive material may further define a third slot that extends from the additional non-conductive area. The plurality of conductive windings may be disposed across the second slot.

In some embodiments, the apparatus may further include a reactive network connected between the first and second pieces of conductive material across the first slot.

In some embodiments, the shape of the first piece of electrically conductive material may further define one or more additional slots. The plurality of conductive windings may be disposed across the one or more additional slots.

In accordance with aspects of the present disclosure, an apparatus for wirelessly coupling power via a first magnetic field generated by a transmitter may include means for at least partially encasing an electronic device, which may include means for generating a second magnetic field in response to the first magnetic field. The means for at least partially encasing may have a shape that defines a non-conductive area for positioning a portion of an electronic device or sensor. A first slot may extend from the non-conductive area. The apparatus may further include means for coupling power via the second magnetic field to power or charge a load. The means for coupling power may be positioned around the non-conductive area and having a portion crossing over the first slot.

In accordance with aspects of the present disclosure, a method for wirelessly coupling power via a first magnetic field generated by a transmitter may include generating a second magnetic field in response to eddy currents induced in an electrically conductive casing portion in response to the first magnetic field. The electrically conductive casing portion may include a first piece of electrically conductive material having a shape that defines a first portion of a non-conductive area for positioning a portion of an electronic device or sensor and a second piece of electrically conductive material having a shape that defines a second portion of the non-conductive area. The first and second pieces of electrically conductive material may be spaced apart by a first slot. The method may further include wirelessly coupling power via the second magnetic field via a power receiving element comprising a plurality of conductive windings disposed on the first and second pieces of electrically conductive material and wound about a periphery of the non-conductive area, the plurality of conductive windings crossing the first slot at first and second locations thereof.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIGS. 6A, 6B, 6C, and 6D illustrate various aspects of another embodiment of a power receiving element with an electrically conductive casing portion of an electronic device in accordance with the present disclosure.

FIGS. 12A, 12B, and 12C illustrate various aspects of another embodiment of a power receiving element with an electrically conductive casing portion of an electronic device in accordance with the present disclosure.

FIG. 13 illustrates aspects of another embodiment of a power receiving element with an electrically conductive casing portion of an electronic device in accordance with the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Figure 1:
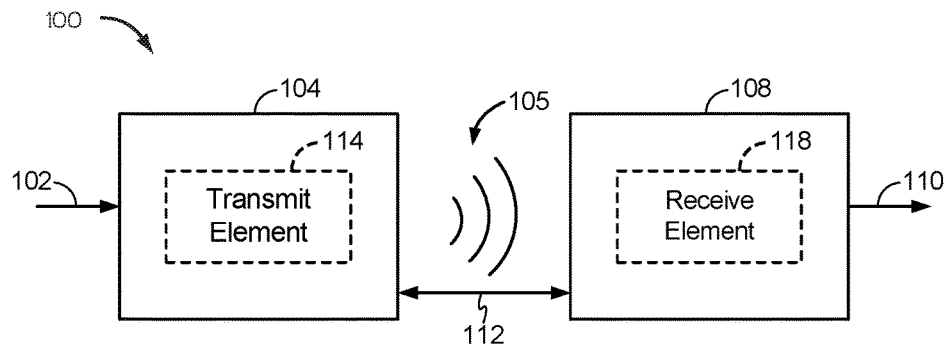
FIG. 1 is a functional block diagram of a wireless power transfer system in accordance with an illustrative embodiment.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104 as will be further described below. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
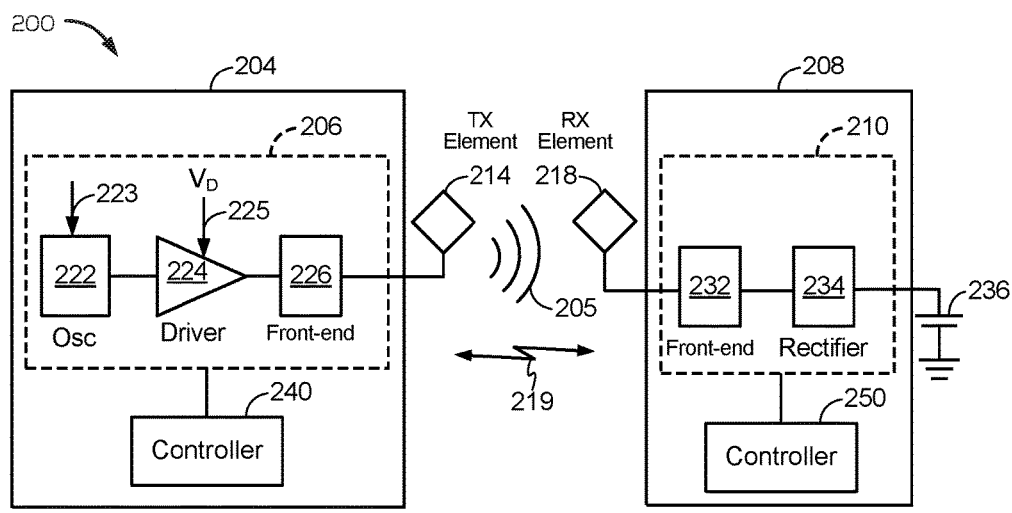
FIG. 2 is a functional block diagram of a wireless power transfer system in accordance with an illustrative embodiment.

FIG. 2 is a functional block diagram of a wireless power transfer system 200, in accordance with another illustrative embodiment. The system 200 may include a transmitter 204 and a receiver 208. The transmitter 204 (also referred to herein as power transmitting unit, PTU) may include transmit circuitry 206 that may include an oscillator 222, a driver circuit 224, a front-end circuit 226. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit to filter out harmonics or other unwanted frequencies. The front-end circuit 226 may include a matching circuit to match the impedance of the transmitter 204 to the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 configured to control one or aspects of the transmit circuitry 206 or accomplish other operations relevant to managing the transfer of power. The controller 240 may be a micro-controller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry to match the impedance of the receive circuitry 210 to the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain embodiments, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
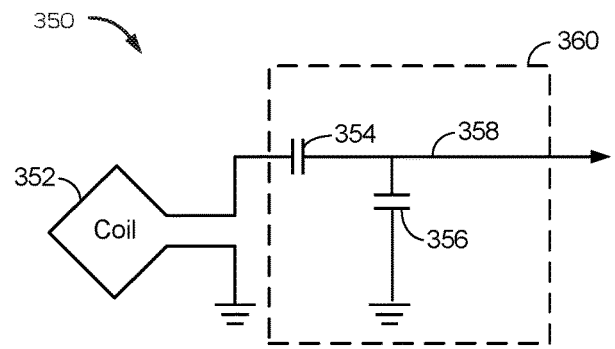
FIG. 3 is a schematic diagram of a portion of transmit circuitry or receive circuitry of FIG. 2 including a power transmitting or receiving element in accordance with an illustrative embodiment.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356 may be added to the transmit and/or receive circuitry 350 to create a resonant circuit.

The tuning circuit 360 may include other components to form a resonant circuit with the power transmitting or receiving element 352. As another non limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352.

In some embodiments, the power receiving elements may be connected in a resonant circuit to form a resonant power receiving element or "resonator"; see, for example, the circuit in FIG. 3. In other embodiments, the receiving elements may not be connected in a resonant circuit. In the figures and description that follow, it will be understood that the disclosed receiving elements may be connected in resonant circuits in some embodiments, and may not be connected in resonant circuits in other embodiments.

The wireless power circuitry described above, and particularly the receiver 208, is intended to be incorporated into a variety of portable electronic devices. Some portable devices may have casings/housings or other portions that are made of a variety of materials including metal. As metal housing portions may be affected by wireless power transfer (particularly for implementations involving magnetic induction—resonant and non-resonant), certain aspects of various implementations described herein are related to incorporating wireless power circuitry into devices with metal covers/casings/housings.

Figure 4A:
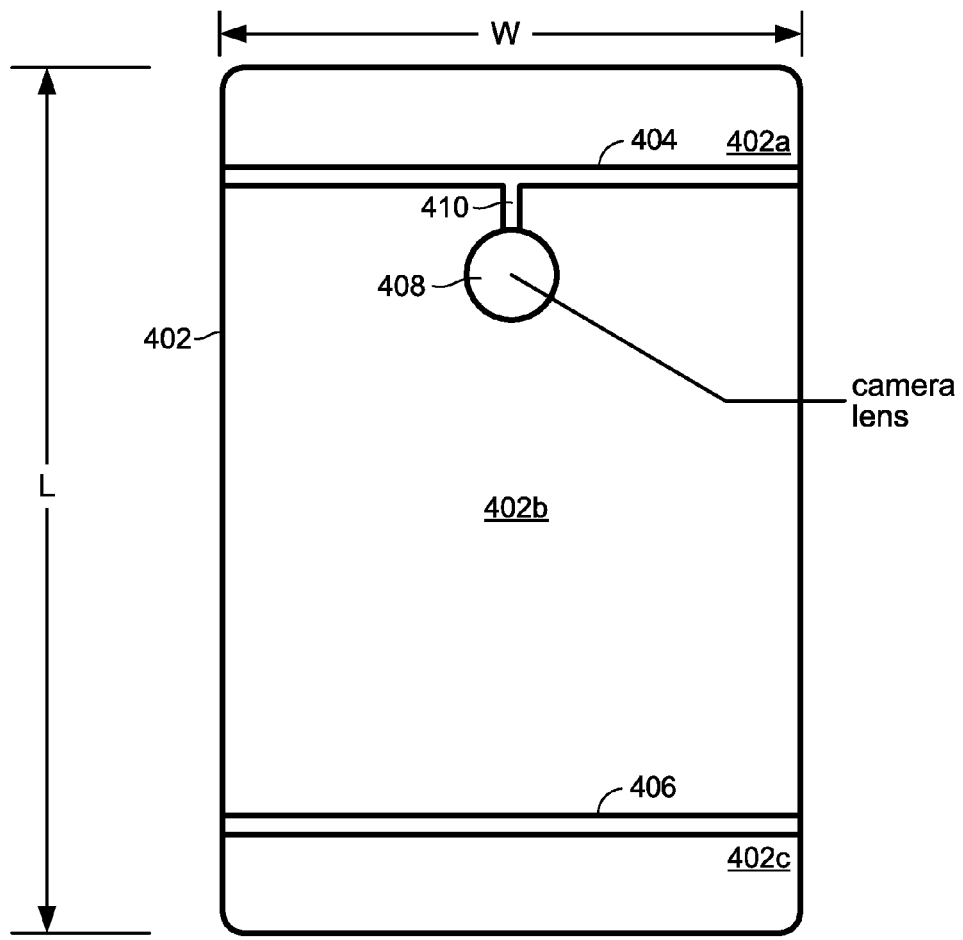
FIGS. 4A and 4B show an example of an electrically conductive casing portion of an electronic device in accordance with the present disclosure.
Figure 4B:
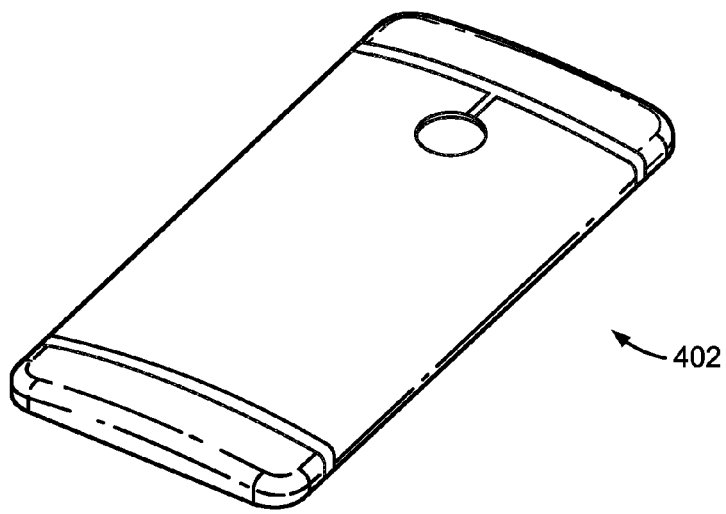

FIGS. 4A and 4B show an example of an electrically conductive casing portion 402 of an electronic device (not shown) in accordance with the present disclosure. The electrically conductive casing portion 402 may form a part of a housing/casing for a variety of portable electronic devices, such as a smart phone, and may be made of out any electrically conductive material such as metal (e.g., aluminum). In aspects of some embodiments, the electrically conductive casing portion 402 forms the back housing of a portable electronic device (e.g., as a metal back cover). The electrically conductive casing portion 402 may be mostly metal (e.g., aluminum) but may have other non-metal components as well for various purposes (e.g., holding various segments of the cover together, aesthetics, etc.). In some embodiments, the electrically conductive casing portion 402 may be rectangular; e.g., the electrically conductive casing portion 402 may have length L greater than its width W.

As shown in FIG. 4A, in accordance with aspects of various embodiments, the electrically conductive casing portion 402 may be shaped to define a non-conductive area 408 that allows for positioning, for example, a camera lens, within the non-conductive area for taking pictures unobstructed by the electrically conductive casing portion 402. While the non-conductive area 408 is described herein with reference to a camera lens, it should be appreciated that the area 408 may be configured to allow various input/output or sensor devices to obtain information unobstructed by the electrically conductive casing portion 402. In other embodiments, the non-conductive area 408 may be defined for aesthetic or other functional or non-functional purposes. For example, the non-conductive area 408 may be an opening for a camera lens.

The electrically conductive casing portion 402 is shaped such that a first slot 410 is defined extending up from the non-conductive area 408 forming an area for the camera lens. The term "slot" as described herein may refer to any gap of any dimension or other non-conductive area or material. Moreover, in some embodiments, the electrically conductive casing portion 402 is shaped such that a second slot 404 and a third slot 406 are defined that run horizontally across the electrically conductive casing portion 402. For example, the electrically conductive casing portion 402 may comprise a first conductive segment 402a, a second conductive segment 402b, and a third conductive segment 402c. The second slot 404 may be defined as a gap between the first and second segments 402a, 402b, and likewise, the third slot 406 may be defined as a gap between the third and second conductive segments 402c, 402b. As described above, other materials may hold the various conductive segments 402a-402c together in a way to form a single mechanically rigid piece to form a portion of the casing for a portable electronic device.

Figure 4C:
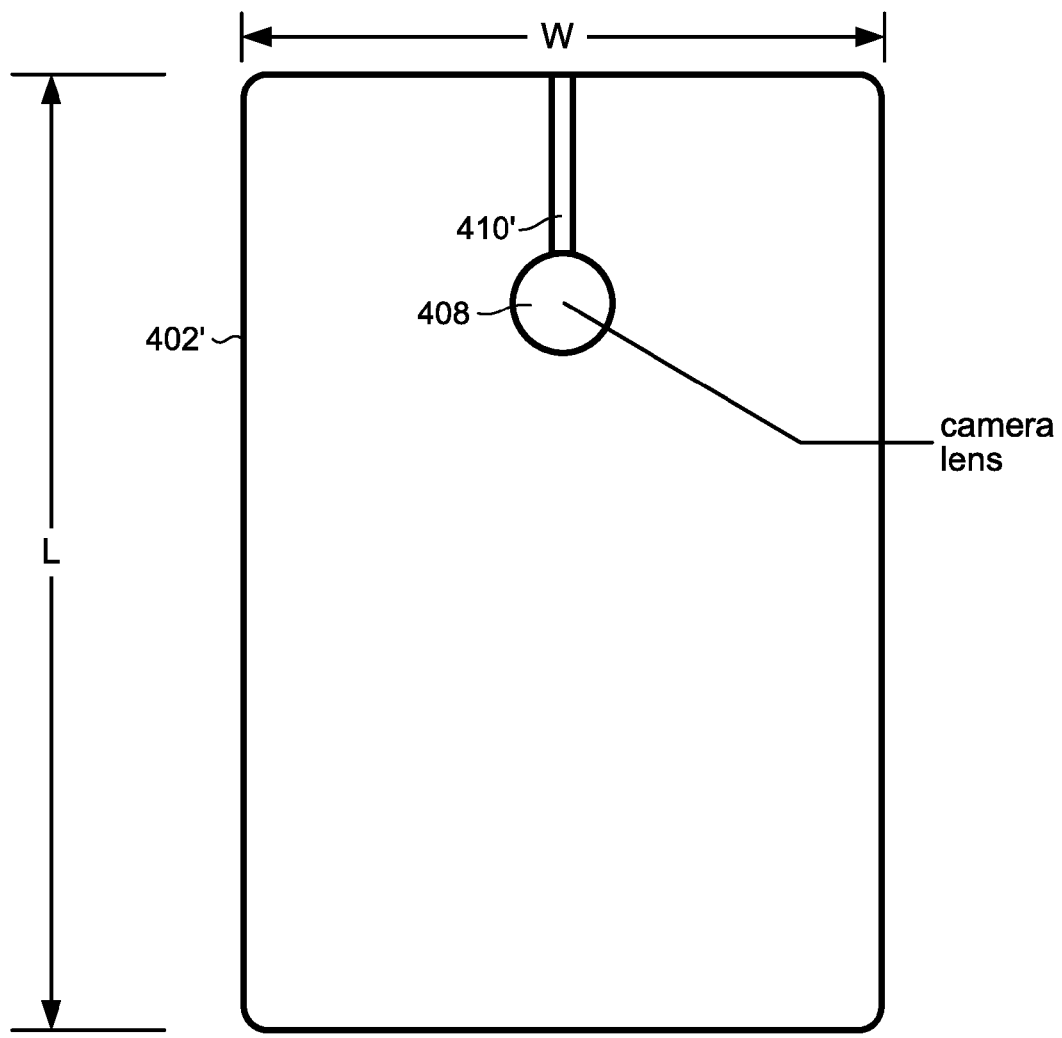
FIG. 4C shows another example of an electrically conductive casing portion of an electronic device in accordance with the present disclosure.

In some embodiments, the second and/or third slots 404, 406 may not be defined in the electrically conductive casing portion 402. Referring for a moment to FIG. 4C, for example, the figure shows an electrically conductive casing portion 402' configured as a single piece. The electrically conductive casing portion 402' may include non-conductive area 408 and a slot 410' that extends from the non-conductive area 408 to the edge of the electrically conductive casing portion 402.

FIG. 4B illustrates a perspective view of the electrically conductive casing portion 402 described with reference to FIG. 4A to show that the electrically conductive casing portion 402 can include side portions to form a portion of a casing that encases a portion of a portable electronic device.

In accordance with aspects of various embodiments described herein, a power receiver element (e.g., the element 352 of FIG. 3) may be positioned relative to the electrically conductive casing portion 402 to be able to wirelessly couple power to charge or power a load (e.g., battery 236) of a portable electronic device.

Figure 5:
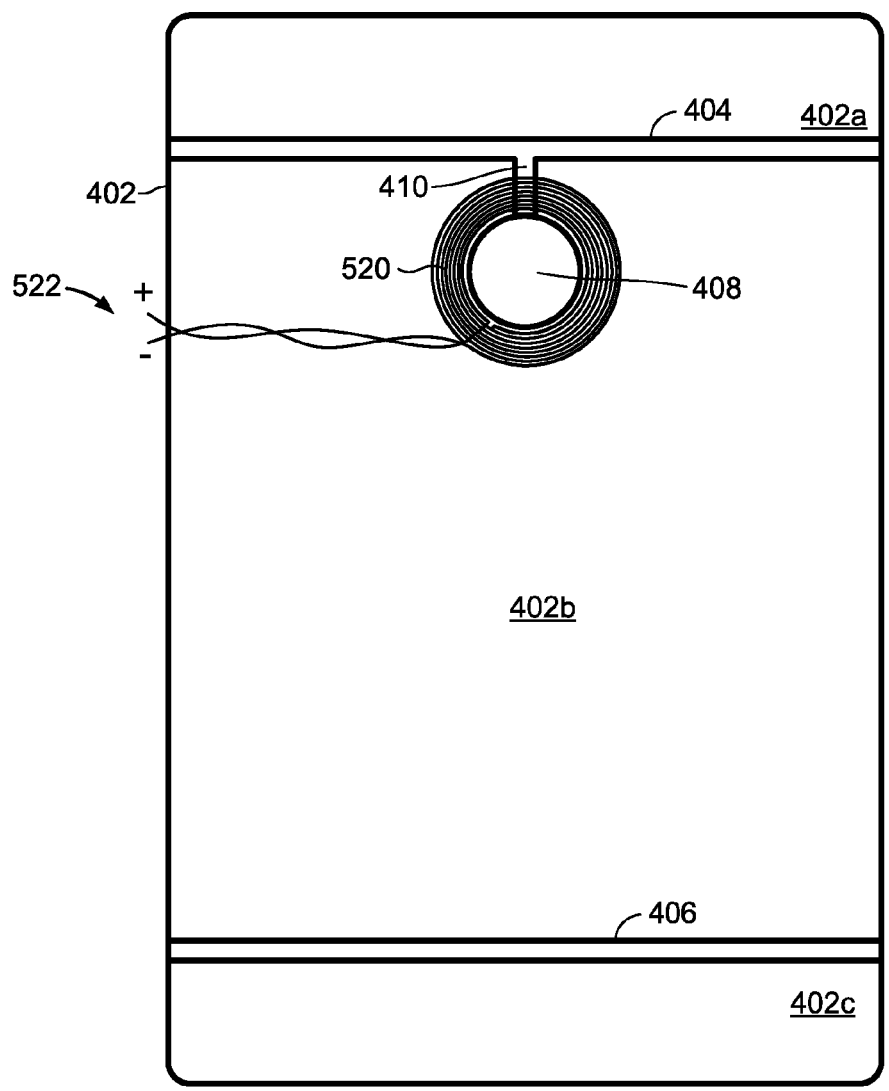
FIGS. 5 and 5A illustrate various aspects of an embodiment of a power receiving element with an electrically conductive casing portion of an electronic device in accordance with the present disclosure.

FIG. 5 illustrates various aspects of an embodiment of a power receiving element 520 with an electrically conductive casing portion 402 of an electronic device in accordance with the present disclosure. In addition to the elements described above with reference to FIGS. 4A and 4B, a power receiving element 520 is included. In accordance with an aspect of an embodiment, the power receiving element 520 is wound around the non-conductive area 408. In accordance with certain embodiments, the power receiving element 520 may include multiple conductive windings (e.g., turns of a coil) wound tightly around and close to but not necessarily overlapping with the non-conductive area 408. In other words, the power receiving element 520 may be adjacent to the edge that defines the non-conductive area 408 in the electrically conductive casing portion 402. In addition, the multiple conductive windings of the power receiving element 520 are wound such that they cross the first slot 410. In certain embodiments, the windings cross the first slot 410 at a 90 degree angle. The multiple conductive windings may be wound very tightly together so that a higher voltage can be induced in the power receiving element 520 along the non-conductive area 408 and the first slot 410. The power receiving element 520 has one or more conductive portions electrically connected to an output at terminals 522.

In operation, a power transmit element 214 (FIG. 2) generates a first magnetic field for wireless power transfer. In response to and when positioned within the first magnetic field, as the electrically conductive casing portion 402 is electrically conductive, eddy currents are generated in the electrically conductive casing portion 402. While eddy currents generally flow throughout the electrically conductive casing portion 402, the intensity and magnitude of the eddy currents increases at the outer perimeter of the electrically conductive casing portion 402. The non-conductive area 408 and the first slot 410, extending from the non-conductive area 408 to the edge of the electrically conductive casing portion 402, effectively increases the outer perimeter of the electrically conductive casing portion 402. The outer perimeter includes the edges of the first slot 410 and the perimeter of the non-conductive area 408. As a result, strong eddy currents may arise along the edges of the first slot 410 and along the perimeter of the non-conductive area 408, and generally flow from a first side of the first slot 410, around the non-conductive area 408 to a second side of the first slot 410. The first slot 410 connects the perimeter of the non-conductive area 408 to the outer perimeter of the electrically conductive casing portion 402, allowing for the placement of the power receiving element 520 around the non-conductive area 408.

A second magnetic field is therefore generated by the electrically conductive casing portion 402 due to eddy currents that flow therein in response to the magnetic field generated by a transmit power element 214 (FIG. 2). As the eddy currents are strongest near the edges of the non-conductive area 408 and first slot 410, the magnitude of the second magnetic field is much stronger in this region (e.g., a local maximum of H-field). A voltage is induced in the power receiving element 520 by the second magnetic field generated by the electrically conductive casing portion 402. The induced voltage causes electrical current to flow through the power receiving element 520, which can be provided to power or charge a load, and in particular, the flow of electrical current in the power receiving element 520 will be in the opposite direction as the flow of eddy currents in the electrically conductive casing portion 402.

By including multiple turns of conductive windings (e.g., 8 or more) closely wound around the non-conductive area, sufficient coupling may be provided between the power receiving element 520 and the second magnetic field generated close to the first slot 410 and non-conductive area 408 to power or charge a load (e.g., on the order of multiple watts). The smaller tightly wound coil of the power receiving element 520 may have a reduced resistance (e.g., because less total wire length is needed). Reducing resistance may be very beneficial for transferring large amount of power as losses in the power receiving element 520 are greatly reduced. In accordance with aspects of this embodiment and the embodiments described below, therefore, a single center coil power receiving element is provided (e.g., potentially reducing a need for additional larger resonators distributed elsewhere) that may be able to wirelessly couple sufficient power (e.g., greater than 3 Watts) for powering a device with a metal casing/housing such as a smartphone or other portable computing device with a metal casing/housing.

Figure 5A:
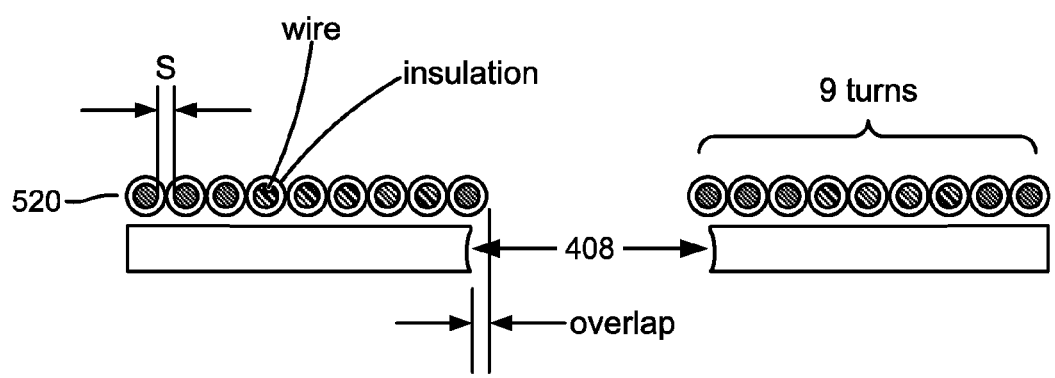

Referring to the cross-sectional view of FIG. 5A, for example, as a non-limiting example, the power receiving element 520 may comprise insulated wire "tightly" wound about the non-conductive area 408. In some embodiments, each winding may be in contact with another winding, for example, where the insulation is in contact with each other on each turn. In some embodiments, for instance, the wire may be 0.2 mm diameter wire with 0.05 mm insulation thickness. With the insulation touching on each turn, the spacing between the wire with each turn is two times the insulation thickness, or 0.1 mm. In this configuration, a resistance of about ~2.7Ω, an inductance of ~1770 nH, and a maximum mutual inductance of 238 nH have been observed.

FIG. 5A further shows that in some embodiments, the coil of wire comprising the power receiving element 520 may overlap the edge that defines the non-conductive area 408 formed through the electrically conductive casing portion 402. The overlap allows the power receiving element 520 to couple to more of the (second) magnetic field generated by the electrically conductive casing portion 402 resulting from a flow of eddy currents in the electrically conductive casing portion 402, thus improving coupling of power by the power receiving element 520.

In some embodiments (not shown), the power receiving element 520 may be fabricated as turns of a trace on a flexible printed circuit board (PCB). Trace resistance increases with decrease in trace thickness. Copper thickness on PCBs is commonly expressed in units of ounces (oz.); an ounce of copper trace on a PCB equals 1.37 thousandths of an inch thickness, or 34.79 μM. Traces thinner than 1 oz. can result in unworkably high resistance (e.g., 4-5Ω). Accordingly, as a non-limiting example, in some embodiments, the trace on a flexible PCB for power receiving element 520 may have a thickness of about 1 oz. to 2 oz.

Figure 6C:
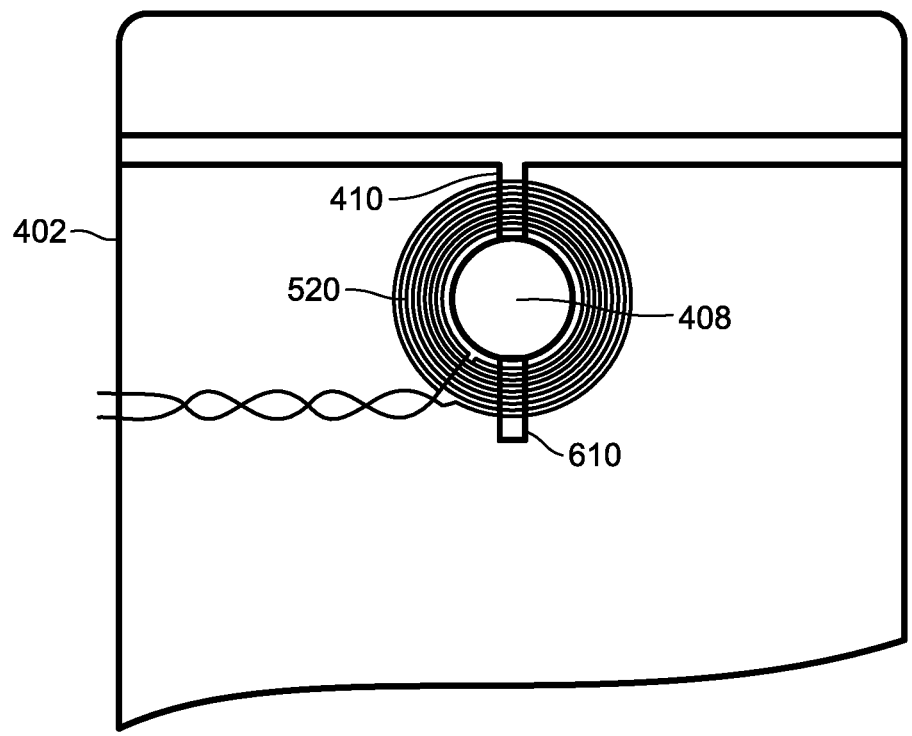

FIGS. 6A, 6B, 6C, and 6D illustrate various aspects of another embodiment of a power receiving element 520 with an electrically conductive casing portion 402 of an electronic device in accordance with the present disclosure. In FIG. 6A, in addition to the elements described above with reference to FIG. 4A, the electrically conductive casing portion 402 further includes a fourth slot 610 that extends from the non-conductive area 408 in a different direction (e.g., down in accordance with aspects of certain embodiments) from the first slot 410. In accordance with the present disclosure, the fourth slot 610 does not extend to the edge (at gat 406) of the electrically conductive casing portion 402. Rather, the extent of the fourth slot 610 reaches only as far the interior of the electrically conductive casing portion 402. The addition of the fourth slot 610 may significantly increase the total area in which the magnitudes of eddy currents flowing in response to the first magnetic field generated by the transmit power element 214 are the highest (FIG. 2); the fourth slot 610 extends the length of the outer perimeter of the electrically conductive casing portion 402. Effectively, the length/size of the area in which concentrated and stronger eddy currents can flow is larger with the further addition of the fourth slot 610. Stated another way, considering the electrically conductive casing portion 402 region including the non-conductive area 408 and slots 410, 610 as a "coupler" or "power transmitting element" the addition of the slot 610 increases the size of this "coupler."

FIG. 6B shows the electrically conductive casing portion 402 of FIG. 6A with the addition of a power receiving element 520 that further crosses over the fourth slot 610. As the area in which stronger eddy current flow is larger overall with the fourth slot 610, the second magnetic field generated by the electrically conductive casing portion 402 in this region is stronger and can therefore significantly increase the coupling of power by the power receiving element 520 to allow sufficient power transfer for powering an electronic device such as a smartphone, without having to increase the number of windings (and hence resistance) in the power receiving element 520.

For example, FIG. 6C is a diagram of an embodiment in accordance with FIG. 6B. In this configuration a total of nine turns are shown that are populated closely around the non-conductive area 408 and crossing over partially obscured first and fourth slots 410 and 610. As a non-limiting example, in accordance with this embodiment, observed power levels that can be delivered via the power receiving element 520 are between ~3 Watts and 4.5 Watts which is sufficient to charge or power certain smartphones. As a further non-limiting example, based on the combination of the coils of the power receiving element 520 and a ferromagnetic material such as ferrite as will be described below, in this configuration an inductance of ~2115 nH, a resistance of ~2Ω, and a maximum mutual inductance of 421 nH have been observed. When including the impact of other components within the device, an inductance of 1777 nH, a resistance of ~2.6Ω and a range of mutual coupling between 196 and 238 nH have been observed. Other values with other configurations are possible and the numerical values provided are given as examples only.

Figure 6D:
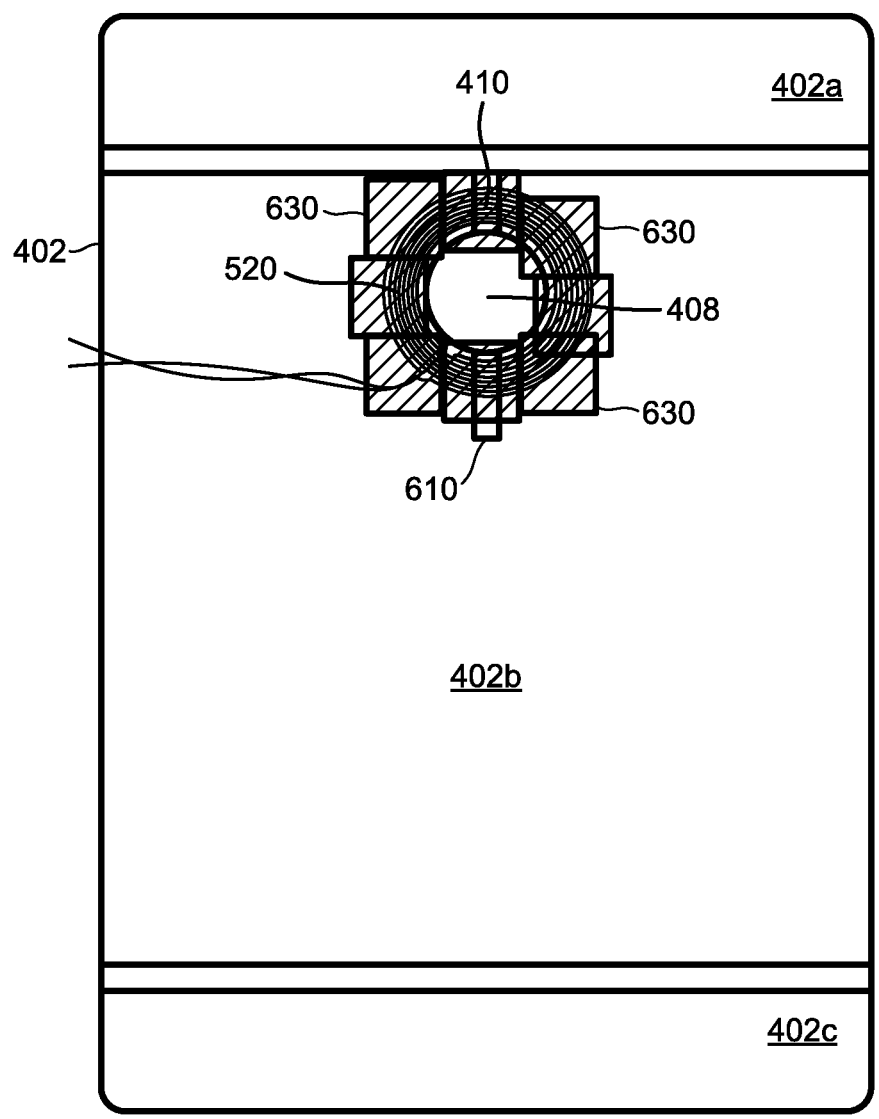
Figure 6D:
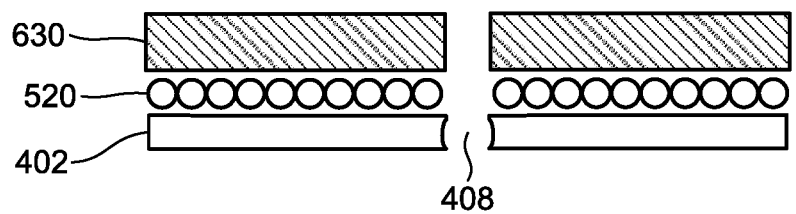

FIG. 6D shows the diagram of FIG. 6B further including a layer of ferromagnetic material 630 (e.g., ferrite) in accordance with another aspect of an embodiment. The ferromagnetic material 630 may be arranged such that it overlaps all or a substantial portion of the power receiving element 520. This improves coupling and channels flux from the second magnetic field for increasing coupling in the power receiving element 520. FIG. 6D includes a side view taken through the non-conductive area 408, showing the layer of the electrically conductive casing portion 402, the layer for the power receiving element 520 with the multiple windings, and the layer of ferromagnetic material 630.

As described above, a large number of turns closely positioned around the non-conductive area 408 can be beneficial for sufficient coupling. As the number of turns increases within the power receiving element 520, the mutual coupling between the power receiving element 520 and the elements generating the magnetic fields significantly increases. For example, the TABLE below provides some illustrative non-limiting numerical values that have been observed to show the impact of increasing the number of turns in the form of increased maximum mutual inductance, showing resistance R and inductance L of the power receiving element 520, and maximum and minimum coupling values.

TABLE

|  |  | R (Ω) | L (uH) | Max M | Min M |
|---|---|---|---|---|---|
| 1 turn | No ferrite or phone | 0.30 | 65 | 35 | 24 |
|  | Ferrite | 0.31 | 70 | 38 | NA |
|  | Ferrite + phone | 0.42 | NA | 28 | 17 |
| 2 turns | No ferrite or phone | 0.50 | 213 | 68 | 47 |
|  | Ferrite | 0.57 | 213 | 70 | 50 |
|  | Ferrite + phone | 0.59 | 191 | 40 | 31 |
| 3 turns | No ferrite or phone | 0.74 | 335 | 102 | 74 |
|  | Ferrite | 0.84 | 359 | 103 | 77 |
|  | Ferrite + phone | 0.88 | 317 | 62 | 44 |
| 4 turns | No ferrite or phone | 0.95 | 492 | 145 | 102 |
|  | Ferrite | 1.1 | 534 | 152 | 104 |
|  | Ferrite + phone | 1.2 | 466 | 83 | 63 |

Figure 7B:
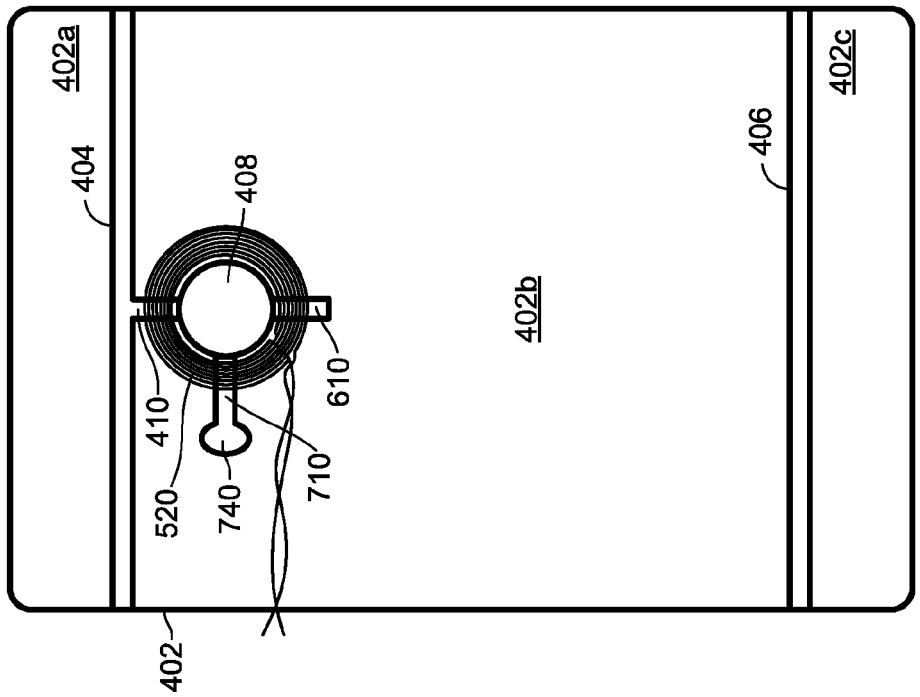
FIGS. 7A and 7B illustrate various aspects of another embodiment of a power receiving element with an electrically conductive casing portion of an electronic device in accordance with the present disclosure.
Figure 7A:
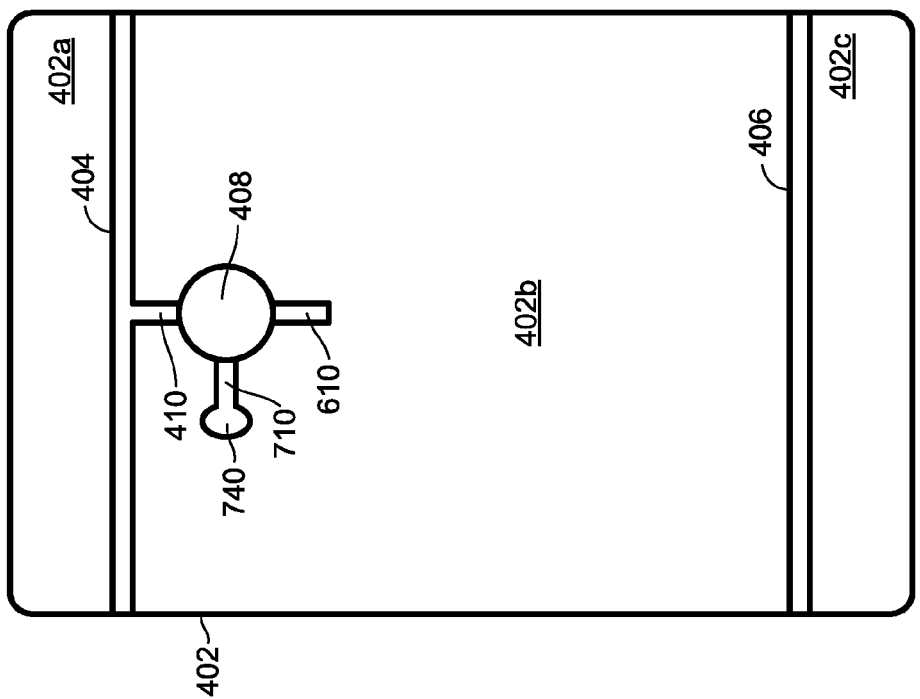

FIGS. 7A and 7B illustrate various aspects of another embodiment of a power receiving element with an electrically conductive casing portion 402 of an electronic device in accordance with the present disclosure. FIG. 7A shows the elements described above with reference to FIG. 6B, and also including a fifth slot 710 extending from the non-conductive region in yet another direction as compared to first and fourth slots 410 and 610 (e.g., horizontally compared to slots 410 and 610). Optionally, the fifth slot 710 can connect into a second non-conductive area 740 that may provide an opening for, for example, a flash light or other sensor. The addition of the fifth slot 710 can further increase the total area or length at which increased eddy currents flow in response to an external magnetic field, such that the resulting second magnetic field as described is stronger through this total area.

FIG. 7B shows the electrically conductive casing portion 402 of FIG. 7A and including the power receiving element 520 that crosses the first slot 410, fourth slot 610, and fifth slot 710. The second magnetic field generated around the non-conductive area 408 and three slots 410, 610, and 710 in the electrically conductive casing portion 402 due to the flow of eddy currents in the non-conductive area 408 and three slots 410, 610, and 710 (e.g., in response to the external magnetic field), induce voltage in the power receiving element 520 to cause current to flow in the power receiving element 520 as described above. Non-limiting observed values according to the configuration of FIG. 7B include a resistance of 2.2 Ohms, inductance of 1.38 uH, and mutual inductance between the ranges of 180 to 246 nH.

It is noted that the slots 410, 610, and 710 may in some cases extend in different directions than shown and at other angles from the non-conductive region. However, in accordance with some embodiments it may be beneficial to wind the conductive windings in a way such that the windings crosses the slots 410, 610, and 710 perpendicular to the direction of the slots (e.g., 90 degrees) such that, for example, the windings cross the vertical slot 610 horizontally and the windings cross the horizontal slot 710 vertically as shown. This may improve total coupling. However, even at different angles sufficient power transfer may be obtained.

It is further appreciated that various parameters of the electrically conductive casing portion 402, the non-conductive area 408, and slots 410, 610, and 710 may be adjusted to increase or decrease M according to the application desired and in accordance with the principles described herein. For example, the number of turns and size of the coil, the size/existence of the fifth slot 710, the size/position of the fourth slot 610, the size of the non-conductive area 408, the size of the second non-conductive area 740, or combinations thereof may all be adjusted to achieve a desired or target amount of mutual coupling.

It is noted that portions of the electrically conductive casing portion 402 may be configured for use as part of other communication antennas. For example different segments/portions/slots of the electrically conductive casing portion 402 may be used for or in conjunction with GPS, Wi-Fi, cellular, NFC, or diversity communications and may be electrically coupled to GPS, Wi-Fi, cellular, NFC, or diversity transmitter/receiver circuitry. The NFC circuitry, the GPS circuitry, the Wi-Fi circuitry, and the cellular circuitry may comprise one or more of elements and components. Thus, the electrically conductive casing portion 402 may serve a variety of purposes.

Figure 8:
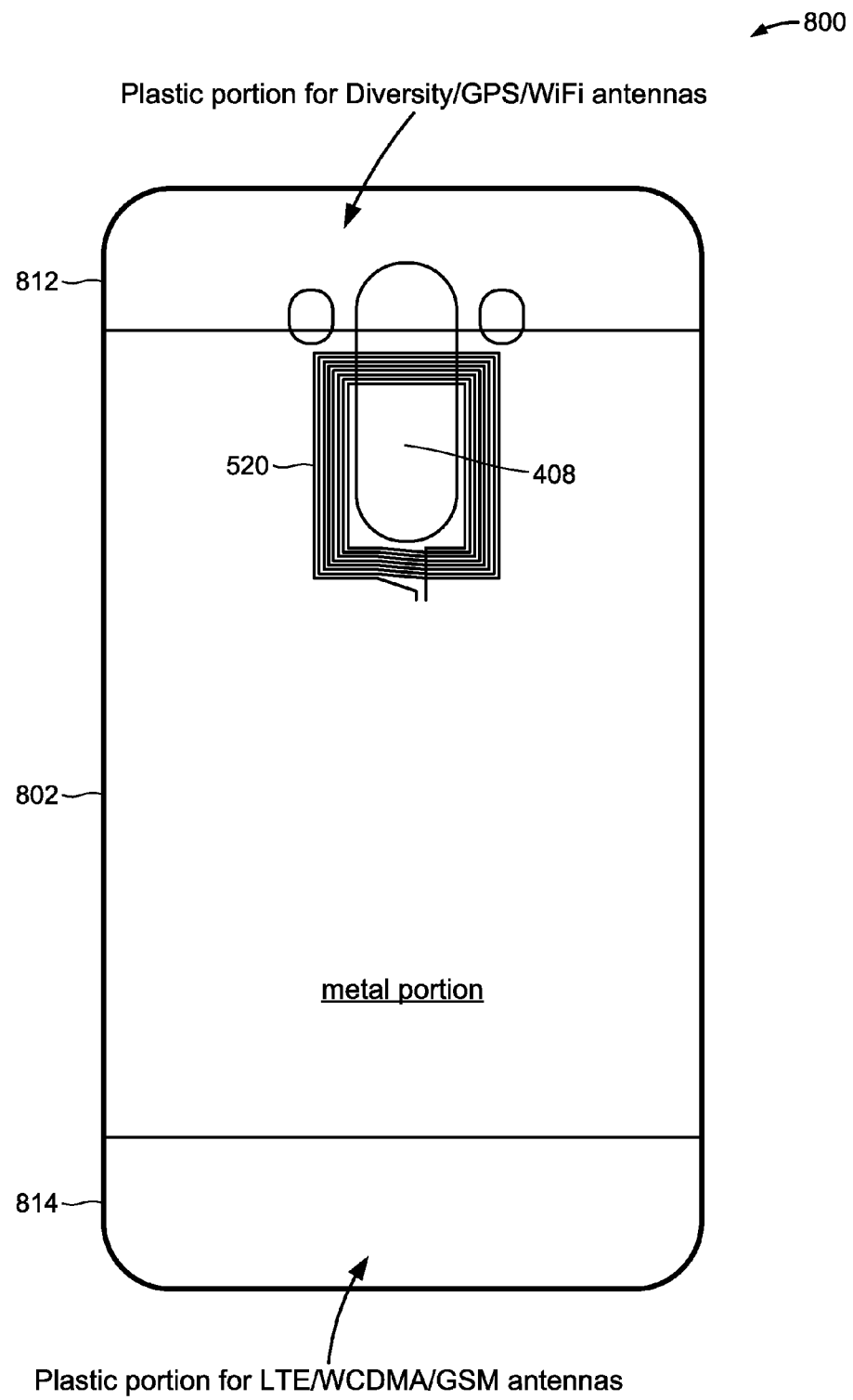
FIG. 8 illustrates various aspects of another embodiment of a power receiving element with an electrically conductive casing portion of an electronic device in accordance with the present disclosure.

FIG. 8 illustrates various aspects of another embodiment of a power receiving element 520 with an electrically conductive casing portion 402 of an electronic device in accordance with the present disclosure. As shown in FIG. 8, a metal back cover 800 is segmented into different portions: top plastic portion 812, electrically conductive casing portion 802, bottom plastic portion 814. To reduce design complexity of WWAN antenna on the metal back cover 800 (e.g., due to the presence of the electrically conductive casing portion 802), a plastic material (e.g., PC or ABS) is added on the top and bottom of the metal back cover 800. As an example only, the top plastic portion 812 may be used in conjunction with diversity/GPS/WiFi antennas and the bottom plastic portion 814 may be used in conjunction with LTE/WCDMA/GSM.

FIG. 8 further shows a different configuration for the non-conductive area 408 similarly as described above. As shown the non-conductive area 408 of FIG. 8 is larger and has a different shape than those described above. In this case, the power receiving element 520 is wound about the non-conductive area 408, but a portion of the power receiving element 520 windings crosses over or spans the non-conductive area 408. As such, a variety of configurations may be possible in accordance with the principles described herein. Furthermore other slots (not shown) may extend from the non-conductive are 408 of FIG. 8 similar to that as described above.

Figure 9:
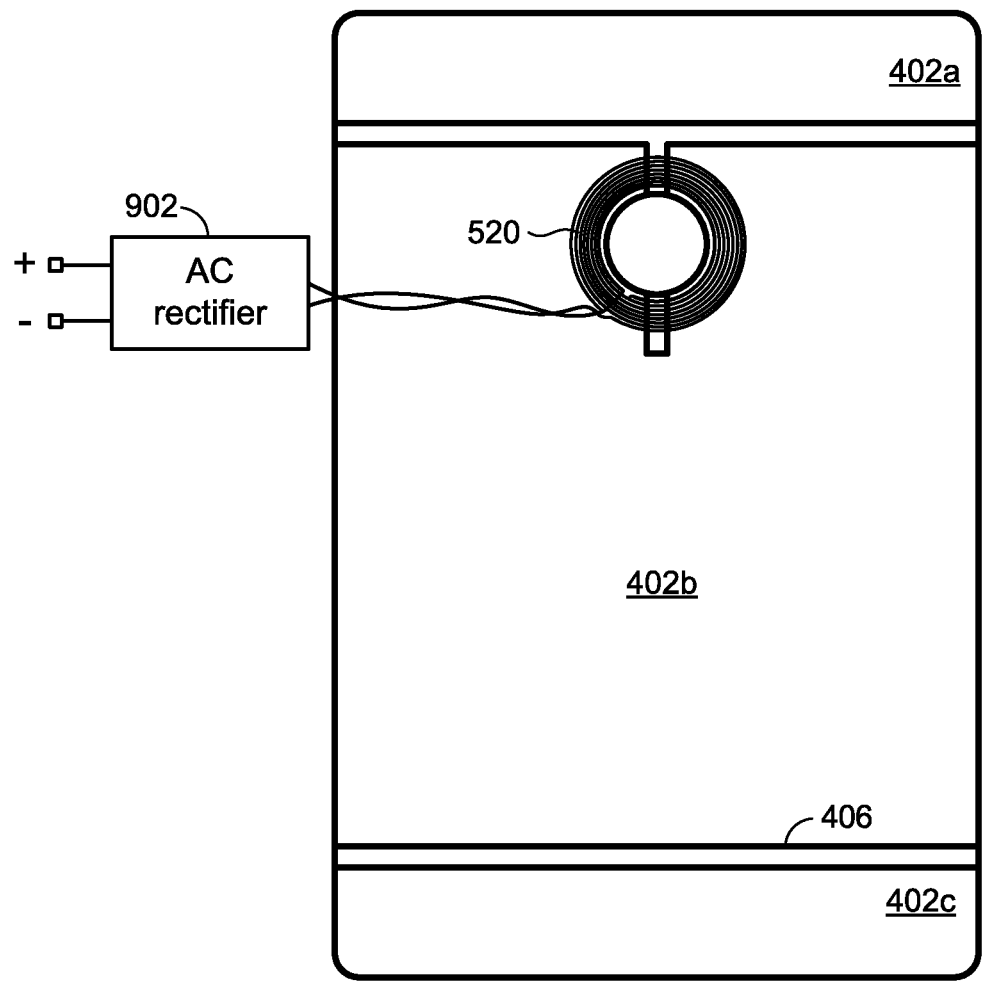
FIG. 9 illustrates the configuration of FIG. 6B while connected with a rectifier circuit.

FIG. 9 illustrates the configuration of FIG. 6B while connected with a rectifier circuit 902. In addition, but not shown, the power receiving element 520 may be electrically coupled to a capacitor, or more generally a tuning circuit, to form a resonant circuit at a desired frequency (e.g., 6.78 MHz).

Figure 10A:
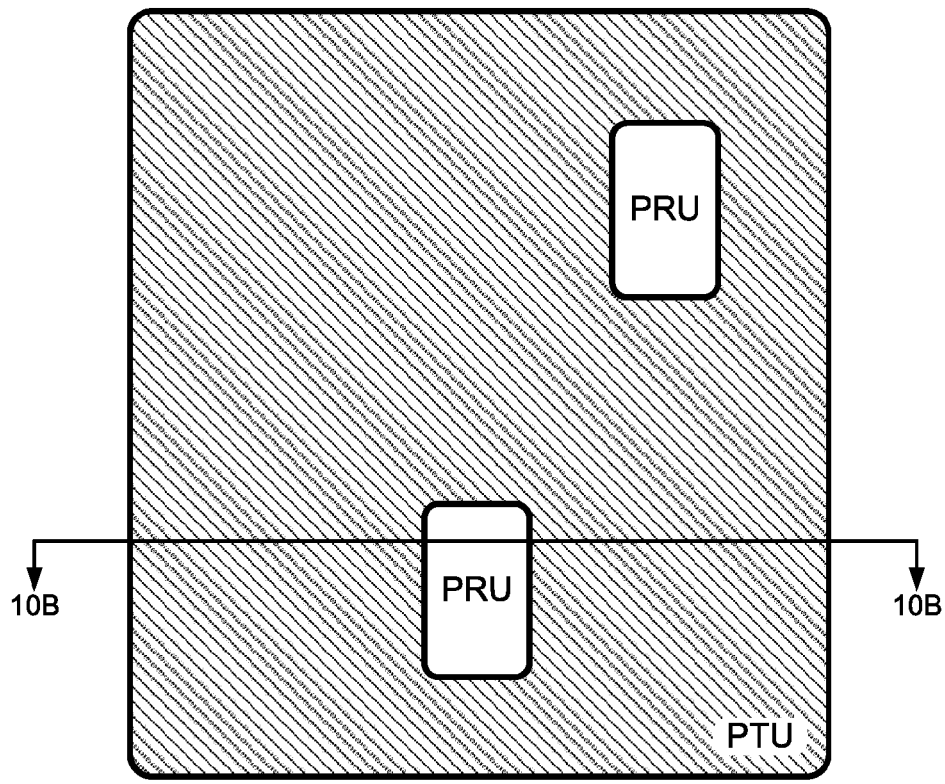
FIGS. 10A and 10B illustrate a configuration of a transmitter with field lines from a generated first magnetic field that may allow for coupling power by one or more receiver devices.
Figure 10B:
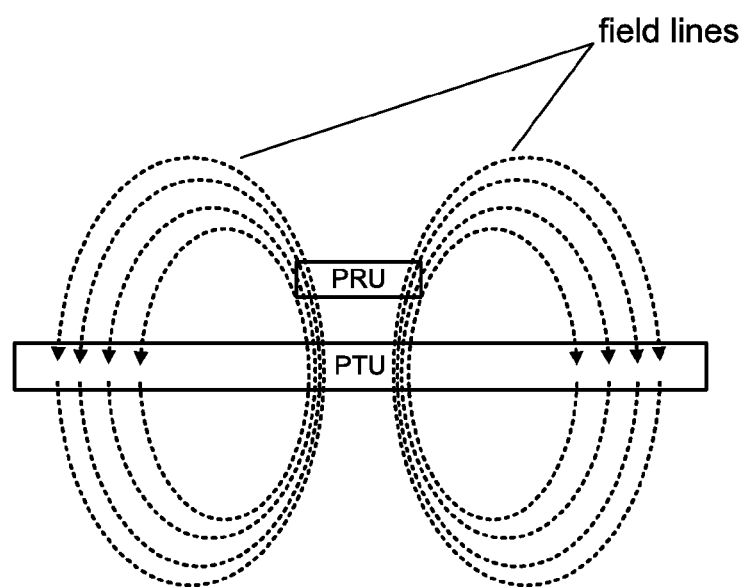

FIGS. 10A and 10B illustrate a configuration of a transmitter (PTU) showing field lines from a generated first magnetic field that may allow for coupling power by one or more receiver devices (PRUs). PTU references a power transmitting unit while PRU references a power receiving unit.

Figure 11B:
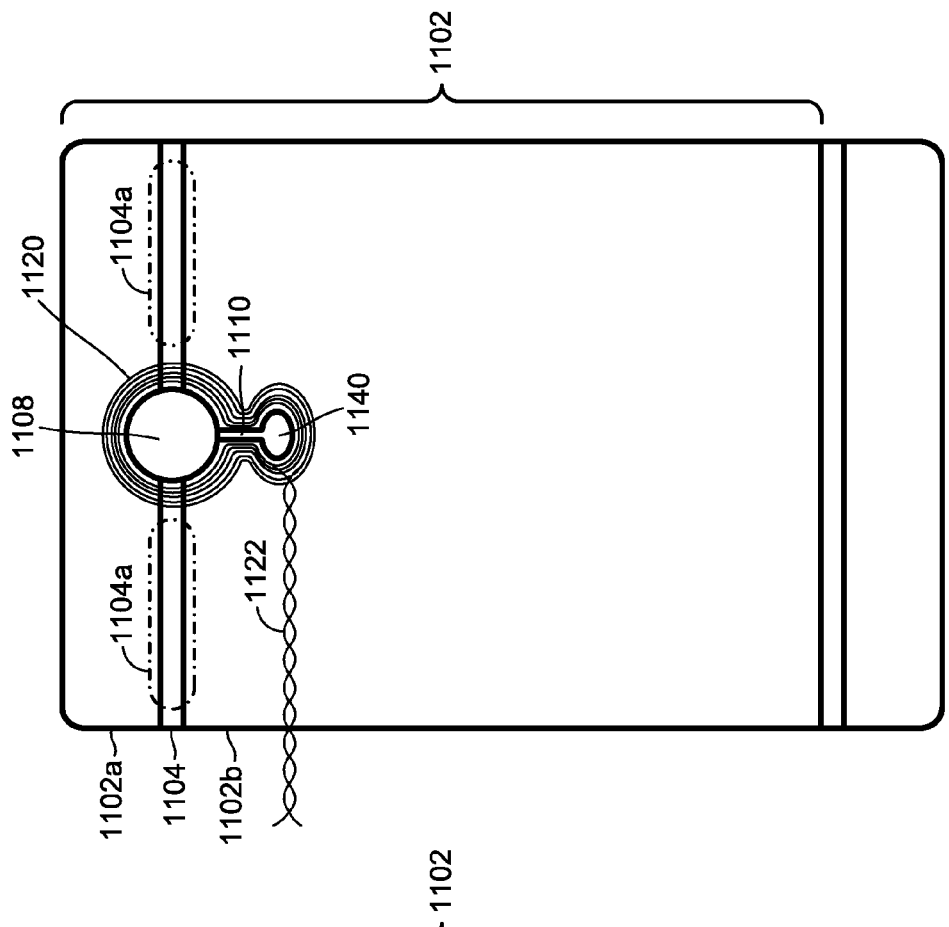
FIGS. 11A and 11B illustrate various aspects of another embodiment of a power receiving element with an electrically conductive casing portion of an electronic device in accordance with the present disclosure.
Figure 11A:
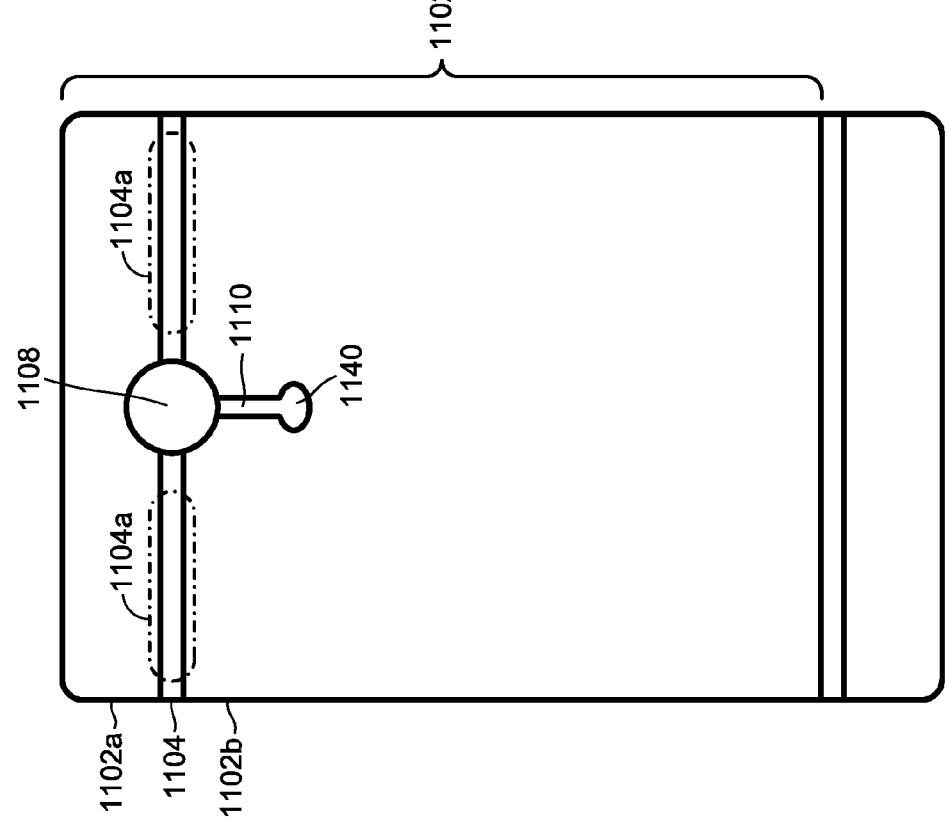

FIG. 11A shows an example of an electrically conductive casing portion 1102 of an electronic device (not shown) in accordance with some embodiments of the present disclosure. The electrically conductive casing portion 1102 may form a part of a housing/casing for a variety of portable electronic devices, such as a smart phone, and may be made of out any electrically conductive material such as metal (e.g., aluminum) In aspects of some embodiments, the electrically conductive casing portion 1102 forms the back housing of a portable electronic device (e.g., a metal back cover). The electrically conductive casing portion 1102 may be mostly metal (e.g., aluminum) but may have other non-metal components as well for various purposes (e.g., holding various portions of the cover together).

As shown in FIG. 11A, the electrically conductive casing portion 1102 may comprise a first piece 1102a and a second piece 1102b. In some embodiments, the first and second pieces 1102a, 1102b may be electrically conductive material. The first and second pieces 1102a, 1102b may be spaced apart to by a slot 1104. FIG. 11A shows that, in some embodiments, keep-out areas 1104a may be designated around the slot 1104 for communication antennas (not shown) disposed on the interior side of the electrically conductive casing portion 1102.

In some embodiments, the electrically conductive casing portion 1102 may be shaped to define a non-conductive area 1108 that allows for positioning, for example, a camera lens, within the non-conductive area for taking pictures unobstructed by the electrically conductive casing portion 1102. For example, the first piece 1102a may be shaped to define a first portion of non-conductive area 1108, and the second piece 1102b likewise may be shaped to define a second portion of non-conductive area 1108. While the non-conductive area 1108 is described herein with reference to a camera lens, it should be appreciated that the area 1108 may be configured to allow various input/output or sensor devices to obtain information unobstructed by the electrically conductive casing portion 1102. In other embodiments, the non-conductive area 1108 may be defined for aesthetic or other functional or non-functional purposes.

In some embodiments, the shape of the first piece 1102a may also define a non-conductive area 1140 that can provide an opening for, for example, a flash light or other sensor. In other embodiments, the non-conductive area 1140 may be defined for aesthetic or other functional or non-functional purposes. The shape of the first piece 1102a may further define a slot 1110 that extends between the portion of non-conductive area 1108 defined by the first piece 1102a and the non-conductive area 1140. As explained above, the term "slot" may refer to any gap of any dimension or other non-conductive area or material.

Referring to FIG. 11B, in accordance with some embodiments, a power receiving element 1120 may be provided on the electrically conductive casing portion 1102. In some embodiments, the power receiving element 1120 may include multiple conductive windings wound about the periphery of non-conductive area 1108, the periphery of the slot 1110 (not crossing the slot 1110), and the periphery of non-conductive area 1140. The conductive windings of the power receiving element 1120 may cross the slot 1104 at two locations, on the left side of non-conductive area 1108 and on the right side of non-conductive area 1108. The power receiving element 1120 may be electrically connected to an output at terminals 1122. In some embodiments (not shown), the power receiving element 1120 may be wound around the periphery of non-conductive area 1108, including crossing the slot 1110 and not wound about the non-conductive area 1140. In still other embodiments (not shown), the power receiving element 1120 may be wound around the periphery of non-conductive area 1140, including crossing the slot 1110 and not wound about the non-conductive area 1108.

In some embodiments, the conductive windings of the power receiving element 1120 (e.g., turns of a coil) may be wound tightly around and close to but not necessarily overlapping with the non-conductive areas 1108 and 1140. The tight windings can couple more strongly to (second) magnetic fields generated by the higher eddy currents induced along the non-conductive areas 1108, 1140, and slot 1110 in the presence of an external (first) magnetic field.

In some embodiments, a layer of ferromagnetic material (such as shown in FIG. 6D, for example) may be provided on the power receiving element 1120. The ferromagnetic material may be arranged such that it overlaps all or a substantial portion of the power receiving element 1120. This can improve coupling and can channel flux from the second magnetic field and increase coupling in the power receiving element 1120.

In operation, a power transmit element 214 (FIG. 2) generates a first magnetic field (e.g., external magnetic field) for wireless power transfer. In response to and when positioned within the first magnetic field, as the electrically conductive casing portion 1102 is electrically conductive, eddy currents may arise in the first and second pieces 1102a, 1102b of the electrically conductive casing portion 1102. Eddy currents may flow generally in the first piece 1102a. The intensity and magnitude of the eddy currents may increase significantly approaching edges along the slot 1104 and the portion of the non-conductive area 1108 defined the first piece 1102a such that the strongest eddy currents can be generated at these edges (e.g., a local maximum of current). Eddy currents may likewise flow generally in the second piece 1102b, and the intensity and magnitude of these eddy currents may increase significantly approaching edges along the slot 1104 and the portion of the non-conductive area 1108 defined the second piece 1102b. In addition, the intensity and magnitude of the eddy currents may increase approaching edges along the slot 1110 and the non-conductive area 1140.

A second magnetic field may therefore be generated by the electrically conductive casing portion 1102 due to the eddy currents that flow in response to the magnetic field generated by a transmit power element 214 (FIG. 2). The magnitude of the second magnetic field will be much stronger in the regions near the edges of slots 1104, 1110 and non-conductive areas 1108, 1140 (e.g., a local maximum of H-field) due to the stronger flow of eddy currents near those edges. Accordingly, a voltage may be induced in the power receiving element 1120 by the second magnetic field generated by the electrically conductive casing portion 1102. The induced voltage can cause electrical current to flow through the power receiving element 1120 that can be provided to power or charge a load.

By including multiple turns of conductive windings (e.g., 8 or more) closely wound around the non-conductive areas 1108, 1140, sufficient coupling may be provided between the power receiving element 1120 and the second magnetic field generated close to the slots 1104, 1110 and non-conductive areas 1108, 1140 to power or charge a load (e.g., on the order of multiple watts). The smaller tightly wound coil of the power receiving element 1120 may reduce resistance. Reducing resistance may be very beneficial for transferring a large amount of power as losses can be greatly reduced. In accordance with aspects of this embodiment and the embodiments described below, therefore, a single center coil power receiving element is provided (e.g., potentially reducing a need for additional larger resonators distributed elsewhere) that may be able to wirelessly couple sufficient power (e.g., greater than 3 Watts) for powering a device with a metal casing/housing such as a smartphone or other portable computing device with a metal casing/housing.

FIGS. 12A and 12B illustrate additional embodiments in accordance with the present disclosure. Referring to FIG. 12A, for example, in some embodiments, the shape of the first piece 1102a of electrically conductive casing portion 1102 may define a slot 1212 that extends from the portion of non-conductive area 1108 defined in the first piece 1102a to an edge of the first piece 1102a. In other embodiments, two more such slots may be defined. The addition of slot 1212 may significantly increase the total area in which the magnitudes of eddy currents flowing in response to the first magnetic field generated by the transmit power element 214 are the highest (FIG. 2). Effectively, the length/size of the area in which concentrated and stronger eddy currents can flow is larger with the further addition of the slot 1212. Stated another way, the electrically conductive casing portion 1102 region including the non-conductive areas 1108, 1140 and slots 1104, 1110, and 1212 may be viewed as a "coupler" or "power transmitting element"; the addition of the slot 1212 can effectively increase the size of this "coupler" and thus increase the coupling of the externally generated magnetic field generated by the transmit power element 214 to the power receiving element 1120.

FIG. 12B further shows, in some embodiments, that the shape of the second piece 1102b of electrically conductive casing portion 1102 may define a slot 1214 that extends from the portion of non-conductive area 1108 defined in the second piece 1102b. As can be seen in the figure, the extent of slot 1214 reaches only as far as the interior area of the second piece 1102b; the slot 1214 does not extend to the edge of the second piece 1102b.

FIG. 12C shows, in some embodiments, the shape of the second piece 1102b of electrically conductive casing portion 1102 may define a slot 1216 that extends from the non-conductive area 1140 into the area of the second piece 1102b, but does not otherwise reach the edge of the second piece 1102b. It will be appreciated that in still other embodiments, either or both the first and second pieces 1102a, 1102b may define combinations of one or more of slots 1212, 1214, 1216, slots in addition to slots 1212, 1214, 1216, and so on. As explained above, these additional slots may effectively increase the size of this "coupler." This can increase the coupling of the externally generated magnetic field generated by the transmit power element 1120.

FIG. 13 shows in some embodiments, one or more circuits 1302, 1304, 1306 may be connected across one or more slots 1104, 1110. The power receiving element is not shown. In some embodiments, for example, any one of the circuits 1302-1306 may be provided. In other embodiments, any combination of two or more of the circuits 1302-1306 may be provided. In embodiments that have additional slots, such as shown in FIGS. 12A-12C for example, additional circuits (not shown) may be connected across those additional slots.

The circuits 1302-1306 may be configured as signal conditioners. For example, the circuits 1302-1306 may be configured as low pass filters, high pass filters, bandpass filters, bandstop filters, and other signal conditioning circuits. The circuits 1302-1306 may comprise combinations of inductive elements, capacitive elements, and resistive elements. The circuits 1302-1306 may include only passive devices, active devices, or combinations of active and passive devices. Merely as an example, a circuit may comprise only a capacitor or only an inductor or a combination of inductors and capacitors (examples of reactive circuits).

In some embodiments, where the slot 1104 provides access for communication antennas and for wireless power transfer, one or more circuits 1302-1306 may be provided to isolate the communication signals and wireless power transfer signals from each other. For example, a capacitor circuit may be used to provide a short with the slot 1104 for a WWAN antenna and an open for wireless power transfer signal. Similarly, an inductor circuit may be used to provide an opening with the slot 1104 for a WWAN antenna and a short for a wireless power transfer signal. Also, an inductor may be used provide an open in the low frequency bands (e.g., 6.78 MHz for wireless power transfer) and a short in the high frequency bands (700/850/900 MHz and 1700/1800/1900/2100/2500 MHz), and vice versa. A filter comprising a combination of capacitive and inductive elements may be used to block and/or pass certain signals, and so on.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the implementations of aspects of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular implementation of aspects of the invention. Thus, the invention may be embodied or carried out in a manner that achieves or optimizes one advantage or group of advantages as taught herein without necessarily achieving other advantages as may be taught or suggested herein.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims. Various modifications of the above described implementations will be readily apparent, and the generic principles defined herein may be applied to other embodiments without departing from the spirit or scope of the invention. Thus, aspects of the present invention is not intended to be limited to the implementations shown herein but is to be accorded the widest scope consistent with the principles and novel features disclosed herein.

What is claimed:

1. An apparatus for wirelessly coupling power via a first magnetic field generated by a transmitter, comprising:
   an electrically conductive casing portion configured to generate a second magnetic field in response to eddy currents induced in the electrically conductive casing portion in response to the first magnetic field, the electrically conductive casing portion having a shape that defines a non-conductive area, a first slot and a second slot extending in different directions from the non-conductive area, and a third slot extending from the non-conductive area in a different direction than the first and second slots; and
   a power receiving element comprising a plurality of conductive windings arranged on the electrically conductive casing portion and wound around the non-conductive area and crossing over the first and second slots, the power receiving element configured to couple to the second magnetic field to output electrical current to wirelessly power or charge a load.

2. The apparatus of claim 1, wherein the conductive windings cross over the first and second slots substantially perpendicular to the direction the first and second slots extend from the non-conductive area.

3. The apparatus of claim 1, wherein the plurality of conductive windings comprise insulated wire wound adjacent the non-conductive area, and each winding of the insulated wire is in contact with another winding of the insulated wire.

4. The apparatus of claim 1, wherein a number of turns of conductive winding around the non-conductive area is between 7 and 12.

5. The apparatus of claim 1, further comprising a ferromagnetic material.

6. The apparatus of claim 1, wherein the power receiving element is wound such that it is non-overlapping with the non-conductive area.

7. The apparatus of claim 1, wherein the power receiving element is wound to cross the non-conductive area.

8. The apparatus of claim 1, further comprising a receive circuit comprising a rectifier operably coupled to the power receiving element and configured to rectify AC through the power receiving element to power the load.

9. The apparatus of claim 1, wherein the first and second slots extend in opposite directions from each other.

10. The apparatus of claim 1, wherein the first and second slots are at 90 degree angles from each other.

11. The apparatus of claim 1, wherein the power receiving element is electrically connected in a resonant circuit.

12. The apparatus of claim 1, further comprising an electronic device or sensor arranged in the non-conductive area.

13. The apparatus of claim 1, wherein the electrically conductive casing portion at least partially encases or houses a portable electronic device.

14. An apparatus for wirelessly coupling power via a first magnetic field generated by a transmitter, comprising:
   an electrically conductive casing portion configured to generate a second magnetic field in response to eddy currents induced in the electrically conductive casing portion in response to the first magnetic field, the electrically conductive casing portion including a first piece of electrically conductive material having a shape that defines a first portion of a non-conductive area and a second piece of electrically conductive material having a shape that defines a second portion of the non-conductive area, the first and second pieces of electrically conductive material spaced apart by a first slot, the second piece of electrically conductive material defining a second slot that extends from the second portion of the non-conductive area; and
   a power receiving element comprising a plurality of conductive windings disposed on the first and second pieces of electrically conductive material and wound about a periphery of the non-conductive area, the plurality of conductive windings crossing the first slot at first and second locations thereof, the power receiving element configured to couple to the second magnetic field to output electrical current to wirelessly power or charge a load.

15. The apparatus of claim 14, wherein the shape of the second piece of electrically conductive material further defines an additional non-conductive area and the second slot such that the second slot extends between the first portion of the non-conductive area and the additional non-conductive area, the plurality of conductive windings further wound about a periphery of the second slot and the additional non-conductive area.

16. The apparatus of claim 15, further comprising a circuit connected across the second slot.

17. The apparatus of claim 16, wherein the circuit is a reactive circuit.

18. The apparatus of claim 15, wherein the shape of the second piece of electrically conductive material further defines a third slot that crosses the second slot, the plurality of conductive windings disposed across the third slot at first and second locations thereof.

19. The apparatus of claim 15, wherein the shape of the second piece of electrically conductive material further defines a third slot that extends from the additional non-conductive area, the plurality of conductive windings disposed across the second slot.

20. The apparatus of claim 14, further comprising a reactive network connected between the first and second pieces of conductive material across the first slot.

21. The apparatus of claim 14, wherein the shape of the first piece of electrically conductive material further defines one or more additional slots, the plurality of conductive windings disposed across the one or more additional slots.

22. An apparatus for wirelessly coupling power via a first magnetic field generated by a transmitter, comprising:
- an electrically conductive casing portion configured to generate a second magnetic field in response to eddy currents induced in the electrically conductive casing portion in response to the first magnetic field, the electrically conductive casing portion having a shape that defines at least a portion of a first non-conductive area, a second non-conductive area, and a first slot extending from the first non-conductive area to the second non-conductive area; and
- a power receiving element comprising a plurality of conductive windings arranged on the electrically conductive casing portion and wound around a periphery of the first and second non-conductive areas and the first slot, the power receiving element configured to couple to the second magnetic field to output electrical current to wirelessly power or charge a load.

23. The apparatus of claim 22, further comprising a receive circuit comprising a rectifier operably coupled to the power receiving element and configured to rectify AC through the power receiving element to power the load.

24. The apparatus of claim 22, wherein the electrically conductive casing portion at least partially encases or houses a portable electronic device.

25. The apparatus of claim 1, wherein the electrically conductive casing portion comprises a third conductive segment spaced apart from the second conductive segment by a second gap therebetween.

26. The apparatus of claim 1, wherein the plurality of conductive windings are tightly wound around the non-conductive area.

27. The apparatus of claim 1, wherein the electrically conductive casing portion comprises a first conductive segment and a second conductive segment spaced apart from the first conductive segment by a gap therebetween, the first slot extending from the non-conductive area to the gap.

28. The apparatus of claim 1, wherein the second slot terminates at an interior of the electrically conductive casing portion.

* * * * *